(12) United States Patent
Kabat et al.

(10) Patent No.: US 7,971,433 B2
(45) Date of Patent: Jul. 5, 2011

(54) HELICAL EXHAUST PASSAGE

(75) Inventors: Daniel Michael Kabat, Oxford, MI (US); Furqan Zafar Shaikh, Troy, MI (US); Bryan Christopher Stoll, South Lyon, MI (US); Sandro Balestrino, Plymouth, MI (US); Michael Levin, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 674 days.

(21) Appl. No.: 12/031,661

(22) Filed: Feb. 14, 2008

(65) Prior Publication Data

US 2009/0205327 A1 Aug. 20, 2009

(51) Int. Cl.
*F01N 1/00* (2006.01)
(52) U.S. Cl. ............... 60/324; 60/274; 60/286; 60/287; 60/301; 60/305
(58) Field of Classification Search .................. 60/274, 60/286, 287, 288, 297, 301, 303, 305, 313, 60/322, 323, 324
See application file for complete search history.

(56) References Cited

U.S. PATENT DOCUMENTS

| | | | | |
|---|---|---|---|---|
| 5,103,641 | A | | 4/1992 | Maus et al. |
| 5,161,370 | A | * | 11/1992 | Brew ............................. 60/299 |
| 6,293,097 | B1 | * | 9/2001 | Wu et al. ........................ 60/286 |
| 6,382,348 | B1 | * | 5/2002 | Chen ............................ 181/239 |
| 6,385,967 | B1 | * | 5/2002 | Chen ............................. 60/312 |
| 6,846,464 | B2 | * | 1/2005 | Montreuil et al. ............ 422/177 |
| 7,351,383 | B2 | * | 4/2008 | Jobson et al. ................. 422/180 |
| 7,380,635 | B2 | * | 6/2008 | Harris ........................... 181/206 |
| 7,784,273 | B2 | * | 8/2010 | Kanaya et al. .................. 60/286 |
| 2003/0185726 | A1 | | 10/2003 | Jobson et al. |
| 2005/0115231 | A1 | | 6/2005 | Ashida et al. |
| 2006/0080953 | A1 | | 4/2006 | Maus et al. |

\* cited by examiner

*Primary Examiner* — Binh Q. Tran
(74) *Attorney, Agent, or Firm* — Julia Voutyras; Alleman Hall McCoy Russell & Tuttle LLP

(57) ABSTRACT

A system and method for treating exhaust gasses from an engine is described. In one example, the exhaust gasses are routed from the engine to atmosphere through a helical exhaust passage. The helical exhaust passage includes a plurality of spatially separated exhaust passages that separates the exhaust flow into separated smaller flows, wherein the smaller flows are re-introduced into a common passage and re-combined to form a single exhaust flow, and wherein the plurality of spatially separated exhaust passages induces a helical flow pattern within the re-combined exhaust flow.

18 Claims, 6 Drawing Sheets ness of ammonia concentration and uniformity of exhaust gas velocity over the cross-sectional flow area of the SCR catalyst) within the engine exhaust gasses upstream of the SCR catalyst.

HELICAL EXHAUST PASSAGE

BACKGROUND AND SUMMARY

Internal combustion engines may utilize an exhaust system that includes a selective catalytic reduction (SCR) catalyst for reducing the amount of NOx that is ultimately discharged to the surrounding environment during operation of the engine. An SCR catalyst may utilize a liquid reductant such as an aqueous urea solution that is injected into the exhaust gasses upstream of the SCR catalyst. Prior to reaching the SCR catalyst, the water droplets within the injected solution may evaporate. The remaining urea component may then hydrolyze and decompose into ammonia which may then enter the SCR catalyst via the exhaust gas flow stream. A catalyst within the SCR catalyst may facilitate a reaction between the NOx component of the exhaust gas flow stream and the ammonia to break down the NOx into water vapor and nitrogen gas. The efficiency of this NOx reduction may be directly proportional to the degree of vaporization of the aqueous urea solution and uniformity of the distribution of the resulting ammonia (i.e. uniformity of ammonia concentration and uniformity of exhaust gas velocity over the cross-sectional flow area of the SCR catalyst) within the engine exhaust gasses upstream of the SCR catalyst.

Various systems have been used in attempts to address incomplete vaporization and unequal distribution of the liquid reductant within the exhaust gas flow stream prior to entering the SCR catalyst. For example, systems may utilize a mechanical device to increase vaporization and distribution of the liquid reductant within the exhaust gas flow stream. Typically, a system of this type will allow for an injected liquid reductant to impinge upon a mechanical device that may aid in the shearing of liquid reductant droplets. The mechanical device will typically be located within an exhaust flow stream, however, and may hence result in back pressure being imparted to the engine and resultant engine horsepower and/or torque losses. Additionally, such mechanical devices may form reductant deposits over time (e.g. melamine), which may eventually clog downstream exhaust passages and may impart an untenable amount of back pressure to the engine. Furthermore, although in-flow mechanical droplet shearing devices may result in improved reductant distribution, the dimensional constraints of such applications may not allow for sufficient mixing length between the injector of the liquid reductant and the SCR catalyst to achieve sufficient vaporization and uniform distribution of ammonia across the exhaust gas flow stream profile. For example, where the liquid reductant is not sufficiently vaporized by the exhaust gasses before reaching the catalyst within the SCR catalyst, drops of liquid may be deposited onto the catalyst, which may leave residue upon evaporation and eventually lead to degradation of the catalyst.

In one approach, a system for treating exhaust gasses from an engine, the exhaust gasses routed from the engine to atmosphere is provided. The system comprises an exhaust passage, the exhaust passage including a plurality of exhaust passages that separates the exhaust flow into smaller flows, wherein the smaller flows are introduced into a common passage and combine to form a single exhaust flow, and wherein the configuration of the plurality of exhaust passages impels the single exhaust flow to exhibit a helical flow pattern.

In this way, by inducing a helical flow pattern within an exhaust passage, angular momentum may be imparted to an exhaust stream flow that may increase reductant droplet shearing, vaporization, and uniform distribution of a liquid reductant within the exhaust gas stream flow. Additionally, the effective mixing length (and hence mixing time) for an exhaust flow stream and an injected liquid reductant may also be increased by utilizing such a configuration. Thus, the utilization of an exhaust passage that may induce a helical flow pattern within an exhaust gas flow stream may reduce backpressure on the engine, increase peak engine torque and horsepower, and increase SCR conversion efficiency via increased vaporization and uniformity of the distribution of the liquid reductant within the exhaust gas flow stream prior to entering the SCR catalyst while also reducing the formation of reductant droplets within the exhaust system.

BRIEF DESCRIPTION OF THE DRAWINGS

FIGS. 1-5 are drawn approximately to scale.

DETAILED DESCRIPTION

Figure 1:
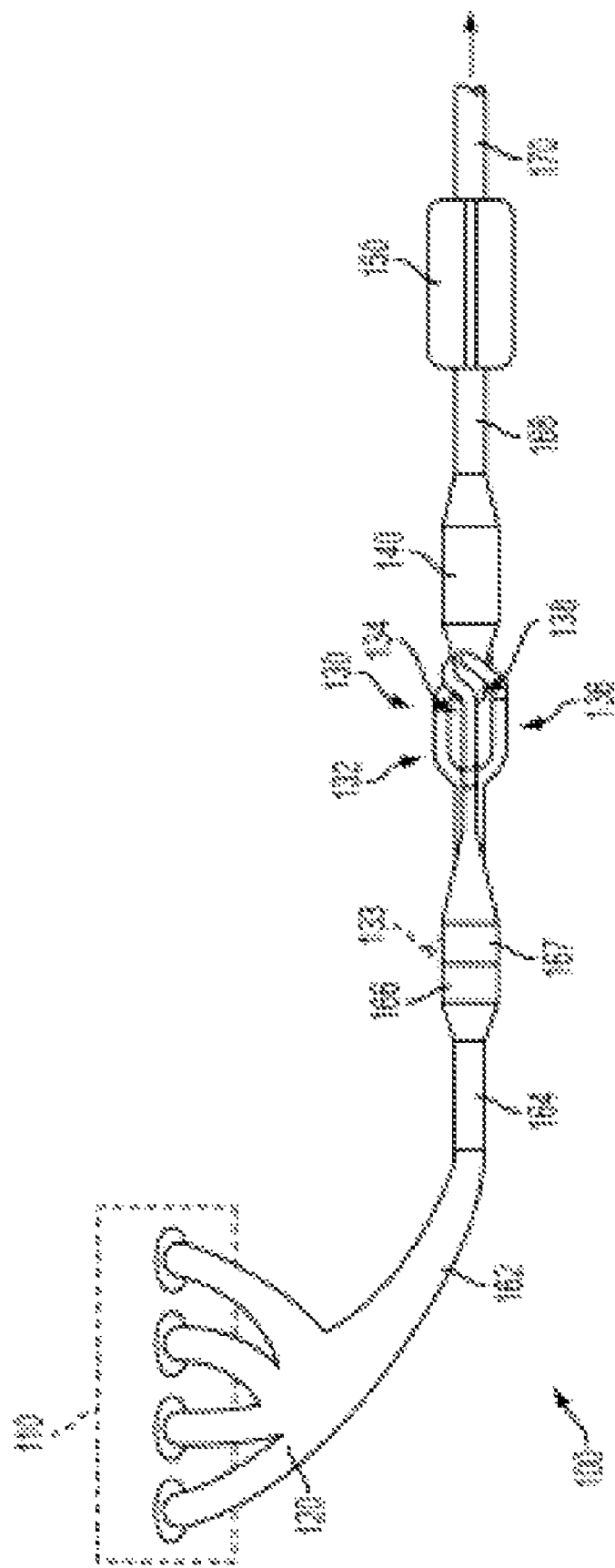
FIG. 1 illustrates an exhaust system for transporting and treating exhaust gasses produced by an internal combustion engine.

FIG. 1 illustrates an exhaust system 100 for transporting and treating exhaust gasses produced by internal combustion engine 110. As one non-limiting example, engine 110 includes a diesel engine that produces a mechanical output by combusting a mixture of air and diesel fuel. Alternatively, engine 110 may include other types of engines such as gasoline burning engines, among others. Further, engine 110 may be configured in a propulsion system for a vehicle. Alternatively, engine 110 may be operated in a stationary application, for example, as an electric generator. While exhaust system 100 may be applicable to stationary applications, it should be appreciated that exhaust system 100 as described herein, is particularly adapted for vehicle applications.

Exhaust system 100 may include one or more of the following: an exhaust manifold 120 for receiving exhaust gasses produced by one or more cylinders of engine 110, and an oxidation catalyst 166 arranged downstream of exhaust manifold 120 for reducing unburned hydrocarbons and carbon monoxide in the exhaust gas flow stream.

Exhaust system 100 may further include one or more of the following: an injector 138 arranged for injecting an exhaust flow with a liquid reductant and which may be configured to inject a variable amount of reductant as operating conditions of the vehicle (e.g. engine load, air-to-fuel ratio, accelerator actuation, NOx sensor feedback, etc.) vary, a helical exhaust passage 130 arranged downstream of oxidation catalyst 166, for receiving an exhaust flow and inducing a helical flow pattern within an expansion cone of the helical exhaust passage that may increase vaporization and the uniformity of the distribution of liquid reductant within the exhaust gas flow stream prior to entering a downstream SCR catalyst, a selective catalytic reduction (SCR) catalyst 140 arranged downstream of helical exhaust passage 130, and a noise suppression device 150 (e.g. muffler) arranged downstream of SCR catalyst 140. As illustrated in FIG. 1, injector 138 may be arranged integral to helical exhaust passage 130. Similarly illustrated in FIG. 1, other embodiments may include an upstream injector 133 (shown in FIG. 1 with dashed lines) that may be located downstream of oxidation catalyst 166 and upstream of helical exhaust passage 130 and may be coupled to exhaust passage 167. Upstream injector 133 may be configured to inject a variable amount of reductant as operating conditions of the vehicle (e.g. engine load, air-to-fuel ratio, accelerator actuation, NOx sensor feedback, etc.) vary. Additionally, in some embodiments, upstream injector 133 may be used in conjunction with injector 138. In other embodiments, upstream injector 133 may be used in lieu of injector 138. In yet other embodiments, multiple upstream injectors 133 may be used in lieu of or in conjunction with injector 138.

Exhaust system 110 may further include a plurality of exhaust pipes and/or passages for fluidically coupling the various exhaust system components. For example, as illustrated by FIG. 1, exhaust manifold 120 may be fluidically coupled to helical exhaust passage 130 by one or more of exhaust passages 162, 164, and 167. SCR catalyst 140 may be fluidically coupled to noise suppression device 150 by exhaust passage 168. Finally, exhaust gasses may be permitted to flow from noise suppression device 150 to the surrounding ambient environment via exhaust passage 170. Note that while not illustrated by FIG. 1, exhaust system 100 may include a particulate filter arranged upstream or downstream of SCR catalyst 140 and/or NOx sensors, the output of which may be utilized to control an amount of reductant injected into an exhaust gas flow of the engine. Furthermore, it should be appreciated that exhaust system 100 may include two or more catalysts.

Helical exhaust passage 130 may include a first spatially separated exhaust passage 132, a second spatially separated exhaust passage 134, and a third spatially separated exhaust passage 136. Furthermore, in some embodiments, helical exhaust passage 130 may include two, four, five, six, or other suitable number of spatially separated exhaust passages. In some embodiments, the sum of the cross-sectional flow areas of first passage 132, second passage 134, and third passage 136 may include a different cross-sectional area or cross-sectional flow area than upstream exhaust passage 164 or downstream exhaust passage 168. In some embodiments, a liquid reductant may be injected to the exhaust flow upstream of helical exhaust passage 130 via upstream injector 133. In other embodiments, a liquid reductant may be injected within helical exhaust passage 130 via injector 138.

Figure 2:
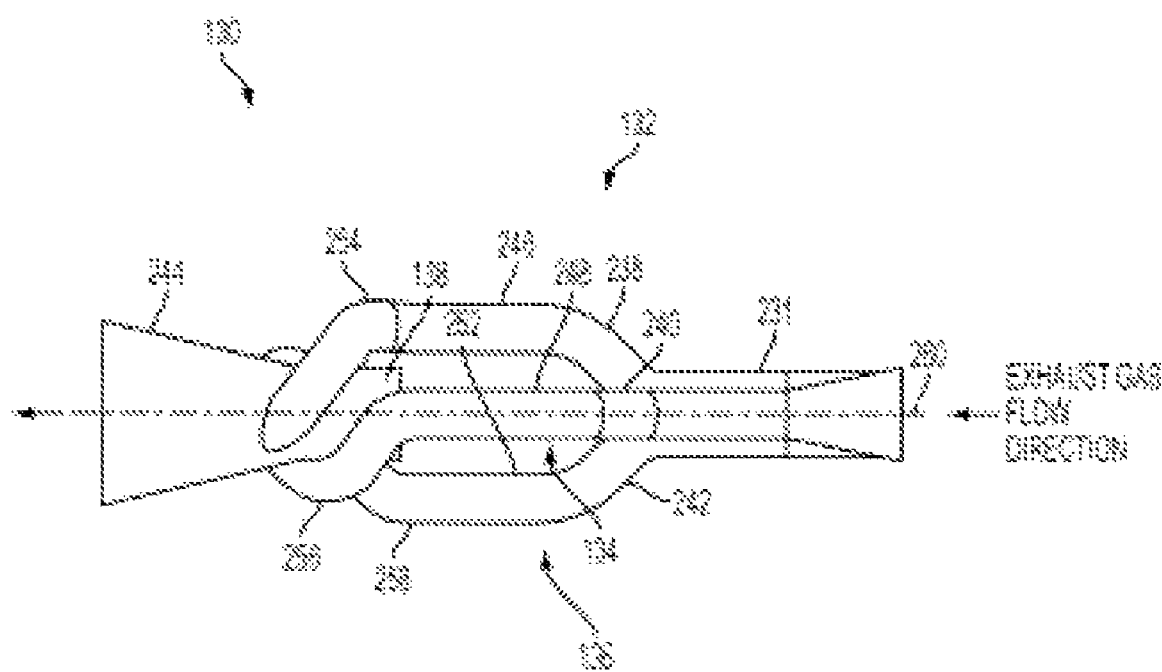
FIG. 2 illustrates a side view of the helical exhaust passage of FIG. 1.

First, second, and third spatially separated exhaust passages 132, 134, and 136 may be configured with multiple curved portions that approximate a helix in shape (as described in greater detail with regard to FIG. 2). Furthermore, first, second and third spatially separated exhaust passages 132, 134, and 136 may be configured to be separate from each other such that an exhaust gas flow stream within a separated exhaust passage is not allowed to mix with an exhaust gas flow stream in another separated exhaust passage. First, second, and third spatially separated exhaust passages 132, 134, and 136 may be configured with relatively straight transitional portions upstream of various curved sections of the first, second, and third exhaust passages and downstream of oxidation catalyst 166 (as described in greater detail with regard to FIG. 2).

The straight transitional sections may act as a transition between oxidation catalyst 166 and the first, second, and third curved portions of helical exhaust passage 130. The exhaust gas flow streams within first, second, and third spatially separated exhaust passages 132, 134, and 136 may directed to a common downstream passage (as described in greater detail with regard to FIG. 2) upstream of SCR catalyst 140 where they may be re-combined into a single exhaust gas flow stream. The first, second, and third curved portions of helical exhaust passage 130 may be configured to allow for the separated exhaust gas flow streams to impart angular momentum to the re-combined single exhaust gas flow stream upon entering the common downstream passage. The angular momentum of the re-combined single exhaust gas flow stream may be manifested as a helical flow pattern within the stream. This may allow for increased shearing of liquid reductant droplets which may increase overall vaporization of and uniformity of the distribution of the liquid reductant within the re-combined exhaust gas flow stream prior to entering SCR catalyst 140.

It should be appreciated that SCR catalyst 140 may include various SCR catalysts for reducing NOx or other products of combustion resulting from the combustion of fuel by engine 110. Note that with regards to vehicle applications, exhaust system 100 may be arranged on the underside of the vehicle chassis. Additionally, it should be appreciated that the exhaust passage portions coupling the various exhaust system components may include one or more bends or curves to accommodate a particular vehicle arrangement. Furthermore, the cross-sectional shapes of the various exhaust system components and the exhaust passage portions that couple the various exhaust system components may be circular, oval, rectangular, hexagonal, or another suitable shape. Further still, it should be appreciated that in some embodiments, exhaust system 100 may include additional components not illustrated in FIG. 1 or may omit components described herein.

FIG. 2 illustrates a side view of the helical exhaust passage of FIG. 1. Helical exhaust passage 130 may receive an exhaust flow from oxidation catalyst 166 via exhaust passage 167 (neither of which are shown in FIG. 2). Upon entering helical exhaust passage 130, exhaust gasses may first be received by inlet transition section 231. As illustrated, inlet transition section 231 may be configured to be a substantially straight section (e.g. no discernible curves or bends). In other embodiments, inlet transition section 231 may include a variable cross-sectional area (e.g. the cross-sectional area of the inlet transition section may vary along its longitudinal axis), curves, and/or bends to accommodate specific frame and/or powertrain component sizes and/or configurations. In yet other embodiments, inlet transition section 231 may be configured to have its cross-sectional area and/or cross-sectional flow area gradually decrease between an inlet of the inlet transition section and an outlet of the inlet transition section. With such a configuration, an exhaust gas flow may be contracted as it flows through inlet transition section 232. Furthermore, inlet transition section 231 may include two or more internal passages that divide the received exhaust gas flow into separate flows.

Helical exhaust passage 130 may include spatially separated exhaust passages 132, 134, and 136 that may separate the single exhaust gas flow stream delivered by inlet transition section into multiple separated exhaust gas flow streams. A portion of spatially separated exhaust passages may be internal to inlet transition section 231. In the illustrated embodiment, the portions of spatially separated exhaust passages 132, 134, and 136 internal to inlet transition section 231 are shown to have substantially equal cross-sectional areas and flow areas. In other embodiments, the cross-sectional area of the portions of spatially separated exhaust passages 132, 134, and 136 internal to inlet transition section 231 may be configured to have unequal cross-sectional areas and/or flow areas.

Spatially separated exhaust passages 132, 134, and 136 may further include forward curved sections 238, 240, and 242, respectively. The portions of spatially separated exhaust passages 132, 134, and 136 internal to inlet transition section 231 may each pass exhaust gasses on to individual forward curved sections. As illustrated, inlet transition section 231 may pass exhaust gasses (via portions of spatially separated exhaust passages 132, 134, and 136 internal to inlet transition section 231) to forward curved sections 238, 240, and 242.

Forward curved sections 238, 240, and 242 may be configured to curve radially outward from central longitudinal flow axis 260 in a clockwise and downstream direction (e.g. towards SCR catalyst 140). In other embodiments, forward curved sections 238, 240, and 242 may be configured to curve radially outward from central longitudinal flow axis 260 in a counter-clockwise and downstream direction. In yet other embodiments, individual forward curved sections may be configured to curve radially outward from central longitudinal flow axis 260 in a counter-clockwise and downstream direction and other individual forward curved sections may be configured to curve radially outward from central longitudinal flow axis 260 in a clockwise and downstream direction.

Forward curved sections 238, 240, and 242 may be substantially identical to each other in terms of length, curvature, cross-sectional area, flow area, and bends. In other embodiments, the forward curved sections may be configured to have different lengths and/or curvatures and/or cross-sectional areas and/or flow areas and/or bends to produce specific flow characteristics such as increasing liquid reductant droplet flight time (in embodiments in which a liquid reductant is injected upstream of helical exhaust passage 130 via upstream injector 133 rather than injected within helical exhaust passage 130 via injector 138) and/or to accommodate specific frame and/or powertrain component sizes and/or configurations. Furthermore, in other embodiments, helical exhaust passage 130 may include two, four, five, six or other suitable number of forward curved sections.

Spatially separated exhaust passages 132, 134, and 136 may further include straight sections 246, 248, and 252. As illustrated, straight sections 246, 248, and 252 may be configured to be substantially straight (e.g. no discernible curves or bends therein) and to receive exhaust gasses from forward curved sections 238, 240, and 242 respectively. Straight sections 246, 248, and 252 may be substantially equivalent to each other in terms of length, curvature(s), cross-sectional area, and bends. In other embodiments, the straight sections may be configured to have different lengths and/or curvatures and/or cross-sectional areas and/or bends to produce specific flow characteristics and/or to accommodate specific frame and/or powertrain component sizes and/or configurations. For example, the lengths of one or more of the straight sections may be increased in some embodiments to allow for greater contact time between exhaust gasses and an injected liquid reductant (in embodiments in which a liquid reductant is injected upstream of helical exhaust passage 130 via upstream injector 133 rather than injected within helical exhaust passage 130 by injector 138) prior to entering SCR catalyst 140. Furthermore, in other embodiments, helical exhaust passage 130 may include two, four, five, six or other suitable number of straight sections.

Spatially separated exhaust passages 132, 134, and 136 may further include rearward curved sections 254, 256, and 258. As illustrated, rearward curved sections 254, 256, and 258 may receive exhaust gasses from forward curved sections 238, 240, and 242 respectively (and straight sections 246, 248, and 252 in some embodiments). Rearward curved sections 254, 256, and 258 may be configured to curve radially inward and at a rotational angle towards central longitudinal flow axis 260 in a counter-clockwise and downstream direction (e.g. towards SCR catalyst 140). In other embodiments, rearward curved sections 254, 256, and 258 may be configured to curve radially inward and at a rotational angle towards central longitudinal flow axis 260 in a clockwise and downstream direction. In yet other embodiments, individual rearward curved sections may be configured to curve radially inward and at a rotational angle towards central longitudinal flow axis 260 in a counter-clockwise and downstream direction and other individual rearward curved sections may be configured to curve radially inward and at a rotational angle towards central longitudinal flow axis 260 in a clockwise and downstream direction. Furthermore, in other embodiments, helical exhaust passage 130 may include two, four, five, six or other suitable number of rearward curved sections. In yet other embodiments, straight sections 246, 248, and 252 may be omitted or partially omitted (e.g. at least one separated exhaust passage may not include a substantially straight section) and one or more spatially separated exhaust passages may include only a forward curved section and a rearward curved section.

As illustrated, helical exhaust passage 130 may include a void region or regions interposed between the plurality of spatially separated exhaust passages 132, 134, and 136. In other words, separated exhaust passages 132, 134, and 136 may be configured to be distinctly separate, fluidically uncoupled exhaust passages that are each separately fluidically coupled to inlet transition section 231 at an upstream end and are each separately fluidically coupled to expansion cone 244 at a downstream end. The empty spaces between the spatially separate exhaust passages may thus form a void region or regions there between. In other embodiments, however, a void region or regions may not be included by helical exhaust passage 130.

Helical exhaust passage 130 may further include expansion cone 244. Expansion cone 244 may be configured to receive separate exhaust gas flows from rearward curved sections 254, 256, and 258 and to re-combine the separate exhaust gas flows into a single exhaust gas flow. Rearward curved sections 254, 256, and 258, may exit separate exhaust gas flows into expansion cone 244 at separate outlets positioned substantially equally with regard to central longitudinal flow axis 260 within expansion cone 244. In other embodiments, rearward curved sections 254, 256, and 258 may be configured to exit separate exhaust gas flows at unequal angles of incidence with central longitudinal flow axis 260 and at different locations along central longitudinal flow axis 260 of expansion cone 244. Likewise, rearward curved sections 254, 256, and 258 may intersect central longitudinal flow axis 260 within expansion cone 244 at substantially equal angles of incidence.

The length, curvature, and bends integral to the rearward curved sections and the longitudinal positioning and angles of incidence of the rearward curved sections with respect to expansion cone 244 may be configured to induce an angular momentum component to the exhaust gas flow stream that may create a helical flow pattern to be formed within the re-combined gas flow. For example, rearward curved sections 254, 256, and 258 may exit separate exhaust gas flows into expansion cone 244 at separate outlets positioned substantially equally with regard to the longitudinal axis of expansion cone 244 so as to increase the rotational velocity of the re-combined gas flow within expansion cone 244. Likewise, the angles of incidence between the respective rearward curved sections and central longitudinal flow axis 260 within the expansion cone may be configured to increase the rotational velocity of the re-combined gas flow within expansion cone 244.

Figure 3:
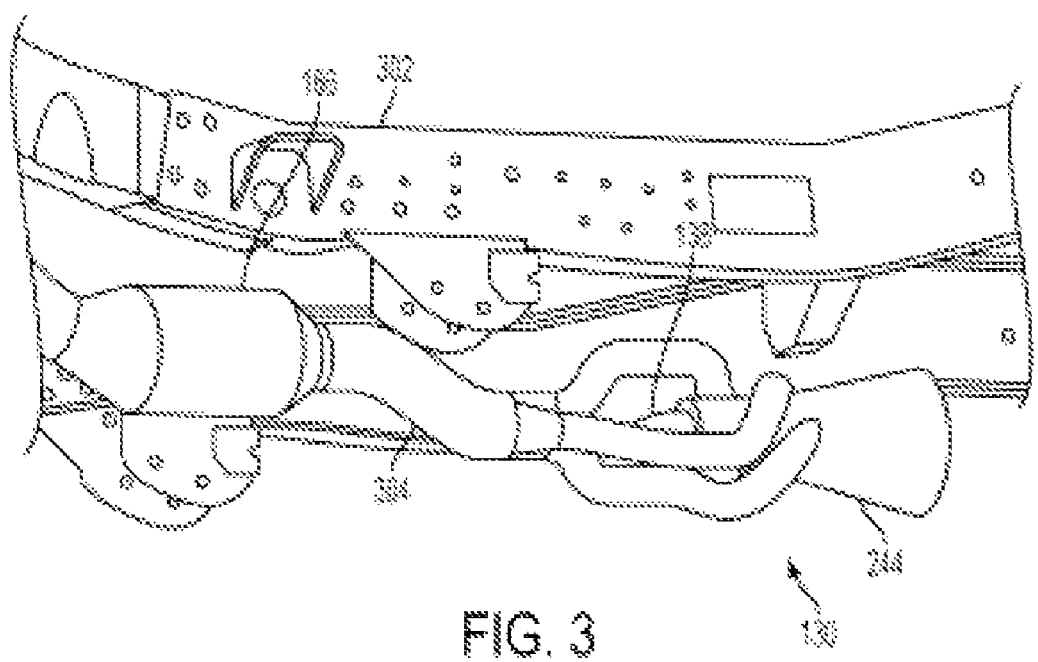
FIG. 3 illustrates a side-view of the helical exhaust passage of FIG. 1 with a concentrically mounted injector, shown relative to a vehicle frame in a typical mounting configuration.

A helical flow pattern created within expansion cone 244 may allow for increased rotational velocity of the re-combined exhaust gas flow. As illustrated in FIG. 3, injector 138 may be arranged concentrically at the base of expansion cone 244. This arrangement may allow for liquid reductant to be injected in a symmetrical pattern into a substantially central region of expansion cone 244 (i.e. symmetric about central flow longitudinal axis 260). Correspondingly, the injected reductant spray droplets may be directed along a flight path that is substantially perpendicular to the helical flow path of the re-combined exhaust gas flow within expansion cone 244. By intersecting the helical flow path of the re-combined exhaust gas flow at a substantially perpendicular angle, the injected liquid reductant may be vaporized and distributed more uniformly throughout the re-combined exhaust gas flow prior to entering SCR catalyst 140. Furthermore, by following a helical flow path, increased liquid reductant flight time may be realized and as such, the liquid reductant may have more time to vaporize and decompose into ammonia prior to entering SCR catalyst 140. Thus, overall conversion efficiency of the SCR catalyst may be increased. Furthermore, in contrast to other methods that may utilize some form of mechanical device that may inhibit the flow of an exhaust gas flow stream to increase the vaporization and uniformity of the distribution of an injected liquid reductant within an exhaust gas flow stream, a helical exhaust passage, with no in-stream flow restrictions, may result in lower exhaust backpressure imparted to the engine and increased peak engine torque and/or horsepower.

Expansion cone 244 may have a smaller inlet diameter (the diameter of the expansion cone at which rearward curved sections 254, 256, and 258 deliver exhaust gasses to the expansion cone) relative to a larger outlet diameter. To wit, as illustrated, the cross-sectional area and/or cross-sectional flow area of the expansion cone may gradually increase from the smaller inlet diameter to the larger outlet diameter so as to expand the re-combined exhaust gas flow which may result in increased vaporization and uniformity of distribution of the reductant within the re-combined exhaust gas flow stream prior to entering SCR catalyst 144. Moreover, in some embodiments, expansion cone 244 may be configured to expand non-linearly in a trumpeted fashion between a smaller inlet diameter to a larger outlet diameter. Furthermore, expansion cone 244 may be coupled to SCR catalyst 244 or to an intermediary exhaust passage that couples expansion cone 244 to SCR catalyst 144.

FIG. 3 illustrates a side-view of helical exhaust passage 130 shown relative to a vehicle frame 302 in a typical mounting configuration. It should be appreciated that FIG. 3 illustrates an example configuration of a vehicle exhaust system with a helical exhaust passage and how the exhaust system might be arranged relative to the vehicle frame. Specifically, it should be noted that the spatially separated exhaust passages 132, 134, and 136 and inlet transition section 231, all included by helical exhaust passage 130, may include multiple bends and/or curves and/or substantially straight sections and/or cross-sectional areas to produce specific flow characteristics and/or to accommodate specific frame and/or powertrain component sizes and/or configurations. Furthermore, exhaust system 100, and more specifically helical exhaust passage 130, may be located vertically lower or higher relative to frame 302. Likewise, the lengthening or shortening of various exhaust system component(s) and/or the insertion of additional exhaust component(s) and/or the omission of exhaust component(s) may allow for helical exhaust passage 130 to be arranged at multiple locations along the length of frame 302. As illustrated in FIG. 3, injector 138 may be arranged concentrically at the base of expansion cone 244.

In some embodiments, at least one component of exhaust system 100 may be directly welded to frame 302. In other embodiments, at least one component of exhaust system 100 may be coupled to frame 302 via a mechanical coupling fastener(s) (e.g. a collar, plate, tie-rod, bolt/nut combination, or other suitable mechanical coupling fastener(s) or combination thereof) that may be welded or bolted to the exhaust system component(s) and/or welded or bolted to the frame. In yet other embodiments, at least some components of exhaust system 100 may be directly welded to frame 302 and other components may be coupled to frame 302 via a mechanical coupling fastener(s). At least one component of exhaust system 100 may be located internal to or partially internal to a channel formed by a member of frame 302. In other embodiments, at least one exhaust system component may be completely external to a channel formed by a member of frame 302.

Figure 4:
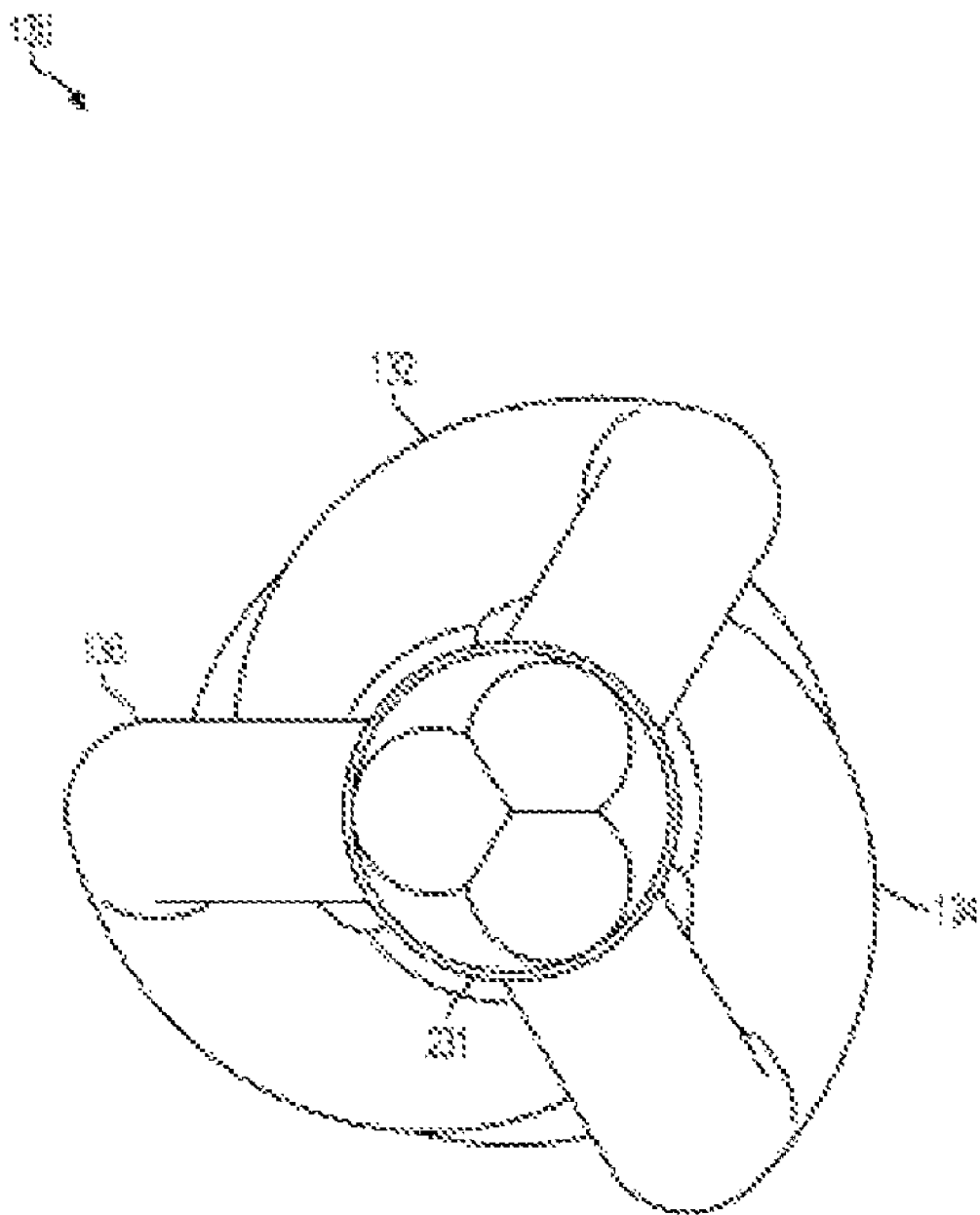
FIG. 4 illustrates a cross-sectional view of the helical exhaust passage of FIG. 1 from a vantage point upstream of the point at which a single exhaust flow stream is separated into multiple separate exhaust flow streams by a plurality of exhaust passages internal to the helical exhaust passage.

FIG. 4 illustrates a cross-sectional view of helical exhaust passage 130 of FIG. 1 from a vantage point upstream of the point at which a single exhaust flow stream is separated into multiple separate exhaust flow streams by the plurality of exhaust passages internal to the helical exhaust passage. As illustrated, transitional section 231 may deliver a single exhaust gas flow stream to a plurality of individual exhaust passages internal to helical exhaust passage 130.

Although shown in FIG. 4 as three separate exhaust passages of substantially equal cross-sectional area spaced equidistant from each other (e.g. there is shown to be approximately 60° between lines drawn between the center of transitional section 231 and the centers of spatially separated exhaust passages 132, 134, and 136), other embodiments may include helical exhaust passage 130 to be configured with two, four, five, or six separated exhaust passages, for example. Furthermore, the spatially separated exhaust passages may be configured with unequal cross-sectional areas and/or unequal angular spacing of the inlets of the spatially separated exhaust passages with respect to transitional section 231 and/or the longitudinal distance between the separated exhaust passage inlets may vary from passage to passage.

As shown in FIG. 4, spatially separated exhaust passages 132, 134, and 136 of helical exhaust passage 130 may be round in cross-sectional shape. Other embodiments may include spatially separated exhaust passages (internal to helical exhaust passage 130) as having rectangular, octagonal, elliptical, or other suitably shaped cross-sections. It should also be appreciated that the cross-sectional shape and/or area of the spatially separated exhaust passages may vary along the length of the spatially separated exhaust passages to produce specific flow characteristics and/or to accommodate specific frame and/or powertrain component sizes and/or configurations.

Figure 5:
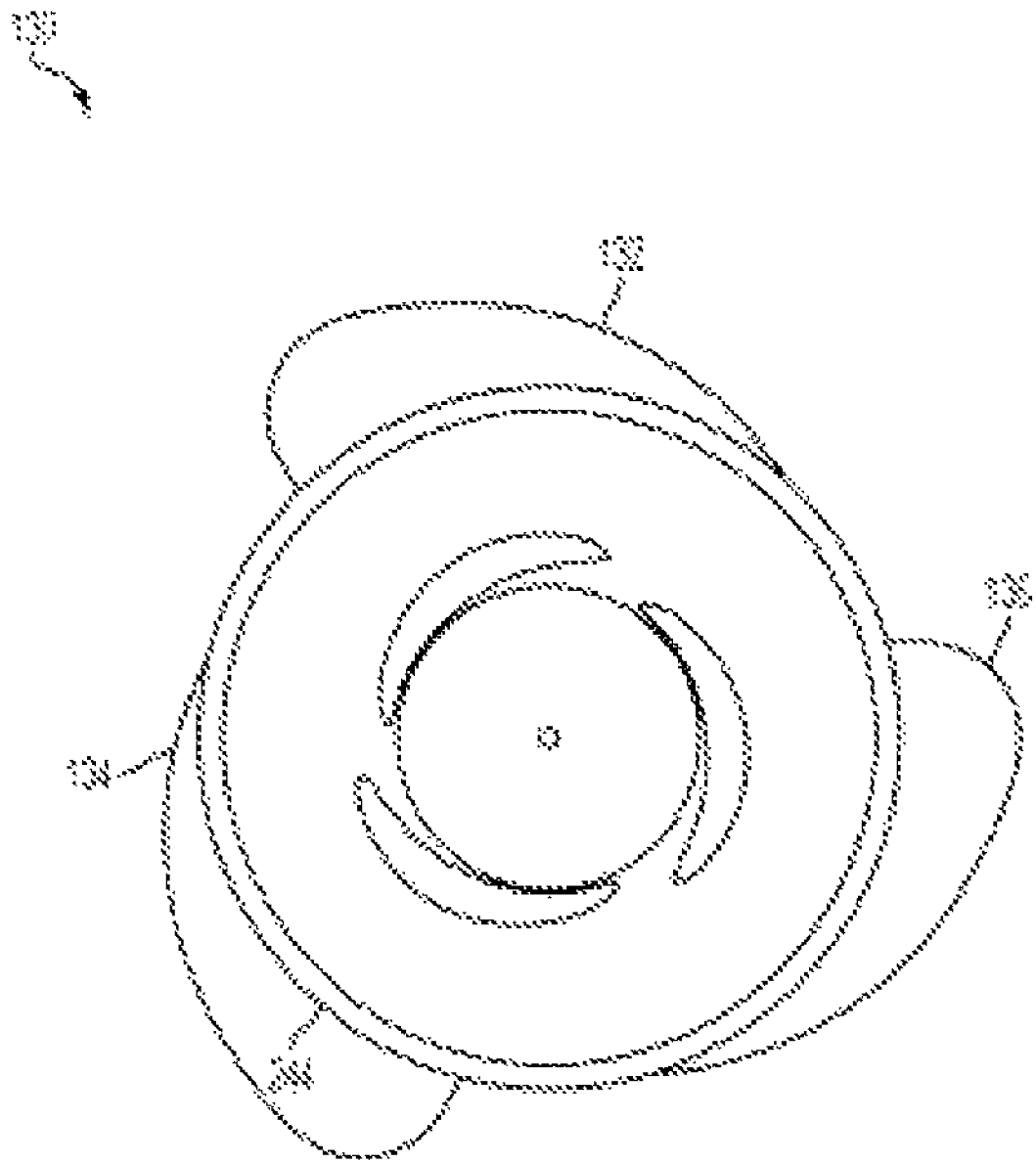
FIG. 5 illustrates a cross-sectional view of the helical exhaust passage of FIG. 1 from a vantage point downstream of the point at which the separated exhaust flow streams are re-combined into a single exhaust flow stream.

FIG. 5 illustrates a cross-sectional view of the helical exhaust passage of FIG. 1 from a vantage point downstream of the point at which the separated exhaust flow streams are re-combined into a single exhaust flow stream. As shown in FIG. 5, three separate exhaust passages of substantially equal cross-sectional area spaced equidistant from each other (the centers of the outlets of the spatially separated exhaust passages are shown substantially equidistant from each other in this cross-sectional view, e.g. there is shown to be approximately 60° between lines drawn between the center of expansion cone 244 and the centers of spatially separated exhaust passages 132, 134, and 136). Other embodiments, however, may include the spatially separated exhaust passages with unequal cross-sectional areas and/or unequal angular spacing (with respect to expansion cone 244) between the inlets of the spatially separated exhaust passages and/or the longitudinal distance between the separated exhaust passage inlets may vary from passage to passage.

The angular and/or longitudinal position and/or cross-sectional area and/or flow area of the inlets of spatially separated exhaust passages 132, 134, and 136 may be configured to increase the angular momentum and/or velocity of the re-combined exhaust gas flow stream within expansion cone 244 that may induce a helical flow pattern within the exhaust gas flow. This may allow for a greater degree of vaporization and uniformity of the distribution of the liquid reductant within the exhaust gas flow stream prior to entering SCR catalyst 140 (not shown in FIG. 5). Furthermore, the cross-sectional shape and/or cross-sectional area along the length of expansion cone 244 and/or the length of expansion cone 244 may be configured to increase the velocity or the contact (mixing) time of the exhaust gasses and liquid reductant of the re-combined exhaust flow stream within the expansion cone and/or configured to reduce backpressure on the engine.

Figure 6:
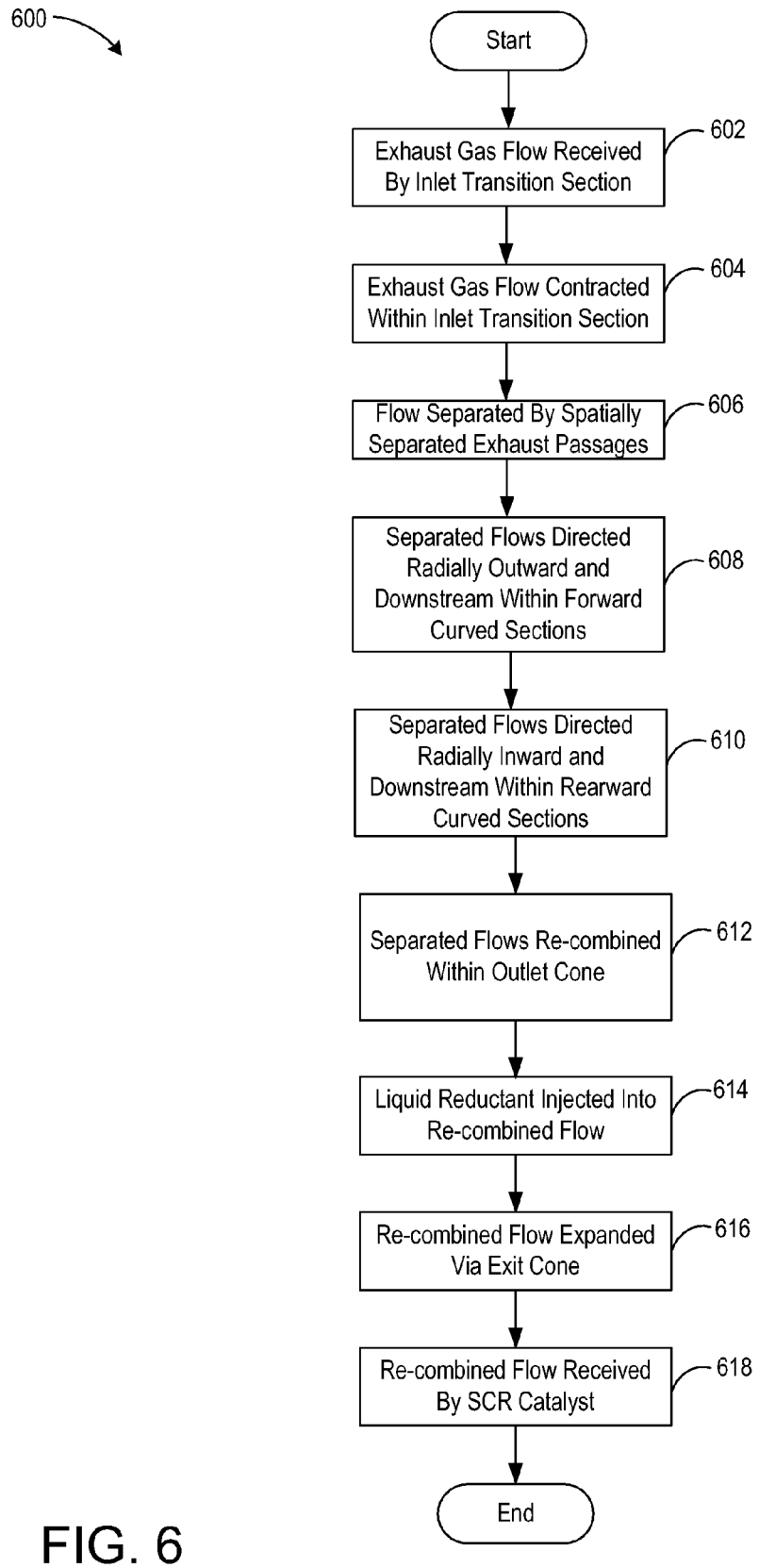
FIG. 6 illustrates a routine for processing an exhaust gas flow through the helical exhaust passage of FIG. 1.

FIG. 6 illustrates a routine for processing an exhaust gas flow through helical exhaust passage 130. At 602, an exhaust gas flow may be received by inlet transition section 231 of helical exhaust passage 130 from oxidation catalyst 166 via exhaust passage 167. Prior to being received by inlet transition section 231, the exhaust gas flow may be injected with a liquid reductant via injector 133. As inlet transition section 231 may be configured to have its cross-sectional area and/or cross-sectional flow area gradually decrease in the downstream direction along its longitudinal axis, at 604 the exhaust gas flow may be contracted within the inlet transition section.

At 606, the exhaust flow may be separated into a plurality of separated exhaust gas flows via spatially separated exhaust passages 132, 134, and 136 of helical exhaust passage 130. At 608, each of the plurality of separated exhaust gas flows may be directed radially outward from central longitudinal flow axis within one of the respective forward curved sections 238, 240, and 242. At 610, each of the plurality of separated exhaust gas flows may be directed radially inward and at a rotational angle towards central longitudinal flow axis 260 within one of the respective rearward curved sections 254, 256, and 258. The length, curvature, and bends integral to the rearward curved sections and the longitudinal positioning and angles of incidence of the rearward curved sections with respect to expansion cone 244 may be configured to induce an angular momentum component to the exhaust gas flow stream that may create a helical flow pattern to be formed when the separated flows are re-combined at 612 within expansion cone 244. At 614, liquid reductant may be injected by injector 138 into expansion cone 244 such that liquid reductant is sprayed substantially symmetrical about central longitudinal flow axis 260. As such, the injected liquid reductant spray droplets may be directed along a flight path that is substantially perpendicular to the helical flow path of the re-combined exhaust gas flow within expansion cone 244. By intersecting the helical flow path of the re-combined exhaust gas flow at a substantially perpendicular angle, the injected liquid reductant may be vaporized and distributed more uniformly throughout the re-combined exhaust gas flow prior to entering SCR catalyst 140. Furthermore, by following a helical flow path, increased liquid reductant flight time may be realized and as such, the liquid reductant may have more time to vaporize and decompose into ammonia prior to entering SCR catalyst 140. At 616, the re-combined exhaust gas flow may be expanded within exit cone 244 which may result in increased vaporization and uniformity of distribution of the reductant within the re-combined exhaust gas flow stream prior to being received by SCR catalyst 144 at 618.

It will be appreciated that the configurations disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for treating exhaust gasses from an engine, the exhaust gasses routed from the engine to atmosphere, the system comprising:
a helical exhaust passage, the helical exhaust passage having an inlet transition section, an expansion cone, and a plurality of spatially separated exhaust passages there between, where exhaust gas flow is received by the plurality of spatially separated exhaust passages from the inlet transition section and is separated into a plurality of separate exhaust gas flows by the plurality of separated exhaust passages, and where the plurality of separate exhaust gas flows are received by the expansion cone and form a re-combined exhaust gas flow therein, at least one of the plurality of separated exhaust passages including a rearward curved section that curves radially inward and at a rotational angle towards a central longitudinal flow axis to induce a helical flow pattern within the re-combined exhaust gas flow formed inside the expansion cone.

2. The system of claim 1 wherein each separated exhaust passage includes a forward curved section and a rearward curved section.

3. The system of claim 2 wherein each forward curved section curves radially outward from the central longitudinal flow axis and each rearward curved section curves radially inward and at a rotational angle towards the central longitudinal flow axis.

4. The system of claim 3 wherein each separated exhaust passage includes a forward curved section, a rearward curved section, and a straight section there between.

5. The system of claim 4 wherein the forward curved sections and the rearward curved sections are configured such that angular momentum is imparted to the re-combined exhaust gas flow.

6. The system of claim 1 wherein the inlet transition section includes an inlet transition section inlet and an inlet transition section outlet; and wherein the exhaust gas flow is contracted between the inlet transition section inlet and the inlet transition section outlet.

7. The system of claim 1 wherein the expansion cone includes an expansion cone inlet and an expansion cone outlet; and wherein the re-combined exhaust gas flow is expanded between the expansion cone inlet and the expansion cone outlet.

8. The system of claim 5 wherein each rearward curved section exits a separated exhaust gas flow into the expansion cone at a substantially equal location along the central longitudinal flow axis within the expansion cone.

9. The system of claim 8 wherein each rearward curved section exits a separated exhaust gas flow into the expansion cone at an angle of incidence between 45° and 80° formed with the central longitudinal flow axis.

10. The system of claim 1 wherein the system further includes an injector concentrically coupled to the expansion cone of the helical exhaust passage, a diesel oxidation catalyst upstream of the helical exhaust passage, and a selective catalytic reduction catalyst downstream of the helical exhaust passage, the injector injecting reductant into the re-combined exhaust gas flow formed within the expansion cone such that reductant impinges the helical flow pattern induced within the re-combined exhaust gas flow at a substantially perpendicular angle.

11. A system for treating exhaust gasses from an engine, the exhaust gasses routed from the engine to atmosphere, the system comprising:

an inlet transition section arranged concentrically along a central longitudinal flow axis, including an inlet transition section inlet and an inlet transition section outlet, the cross-sectional flow area of the inlet transition section gradually decreasing between the inlet transition section inlet and the inlet transition section outlet;

an expansion cone arranged concentrically along the central flow longitudinal axis including an expansion cone inlet and an expansion cone outlet, the cross-sectional flow area of the expansion cone gradually increasing between the expansion cone inlet and the expansion cone outlet; and a plurality of spatially separated exhaust passages arranged downstream of the inlet transition section outlet and upstream of the expansion cone inlet, the spatially separated exhaust passages including a plurality of forward curved sections and a plurality of rearward curved sections, each forward curved section curving radially outward from the central longitudinal flow axis and each rearward curved section curving radially inward and at a rotational angle towards the central longitudinal flow axis.

12. The system of claim 11, wherein each separated exhaust passage includes a forward curved section, a rearward curved section, and a straight section there between.

13. The system of claim 11, wherein exhaust gas flow is received by the plurality of spatially separated exhaust passages from the inlet transition section and is separated into a plurality of separate exhaust gas flows by the plurality of separated exhaust passages, and where the plurality of separate exhaust gas flows are received by the expansion cone and form a re-combined exhaust gas flow therein, the plurality of separate exhaust passages shaped to induce a helical flow pattern within the re-combined exhaust gas flow formed within the expansion cone.

14. The system of claim 13, wherein the rearward curved sections are configured such that angular momentum is imparted to the re-combined exhaust gas flow.

15. The system of claim 13, wherein the exhaust gas flow is contracted between the transition section inlet and the transition cone outlet.

16. The system of claim 13, wherein the re-combined exhaust gas flow is expanded between the expansion cone inlet and the expansion cone outlet.

17. The system of claim 13 wherein each rearward curved member exits a separated exhaust gas flow into the expansion cone at a substantially equal location along the central longitudinal flow axis within the expansion cone.

18. The system of claim 13 wherein the system further includes an injector concentrically coupled to the expansion cone of the helical exhaust passage, a diesel oxidation catalyst upstream of the helical exhaust passage, and a selective catalytic reduction catalyst downstream of the helical exhaust passage, the injector injecting reductant into the re-combined exhaust gas flow formed within the expansion cone such that reductant impinges the helical flow pattern induced within the re-combined exhaust gas flow at a substantially perpendicular angle.

* * * * *